(12) United States Patent
Soerensen et al.

(10) Patent No.: US 8,642,105 B2
(45) Date of Patent: Feb. 4, 2014

(54) BUTTER MAKING DEVICE

(75) Inventors: Erik Dons Soerensen, Silkeborg (DK); Ernst Noergaard Petersen, Silkeborg (DK)

(73) Assignee: SPX Flow Technology Danmark A/S, Silkeborg (DK)

( * ) Notice: Subject to any disclaimer, the term of this patent is extended or adjusted under 35 U.S.C. 154(b) by 633 days.

(21) Appl. No.: 12/514,427

(22) PCT Filed: Nov. 9, 2007

(86) PCT No.: PCT/EP2007/009738
§ 371 (c)(1),
(2), (4) Date: May 10, 2011

(87) PCT Pub. No.: WO2008/058684
PCT Pub. Date: May 22, 2008

(65) Prior Publication Data
US 2011/0206822 A1 Aug. 25, 2011

(30) Foreign Application Priority Data
Nov. 11, 2006 (EP) .................................... 06023509

(51) Int. Cl.
*A23C 15/00* (2006.01)
*A01J 15/00* (2006.01)

(52) U.S. Cl.
USPC ................ 426/581; 426/664; 99/452; 99/466

(58) Field of Classification Search
USPC ............ 426/580, 581, 663, 664; 99/452, 455, 99/456, 466
See application file for complete search history.

(56) References Cited

U.S. PATENT DOCUMENTS 2,395,051 A    2/1946   Horneman

FOREIGN PATENT DOCUMENTS

| DE | 2916625 A1 | 11/1980 |
| DE | 3426280 C1 | 11/1985 |
| GB | 689657 A | 4/1953 |
| GB | 2195352 A | 4/1988 |

*Primary Examiner* — Leslie Wong
(74) *Attorney, Agent, or Firm* — Baker & Hostetler LLP

(57) ABSTRACT

The present invention relates to a butter making device comprising a butter containing section containing a basic butter product to be processed further, a dosing unit for adding additives to the basic butter product, and a flow restricting and generating device disposed at the butter containing section for passing butter from the butter containing section for further processing the basic butter product to the dosing unit, wherein at least one further dosing unit and at least one further flow restricting and generating device disposed at the butter containing portion for passing basic butter containing section to the at least one further dosing unit.

16 Claims, 2 Drawing Sheets

1 Churning section
2 Separating section
3 Regulating gate
4 Vacuum chamber
5 Working section I
6 Working section II
7 Butter pump

BUTTER MAKING DEVICE

CROSS-REFERENCE TO RELATED APPLICATIONS

This application is a National Stage of PCT/EP2007/009738 filed on Sep. 11, 2007 (published as WO 2008/058684 A1 on May 22, 2008), which claims priority to foreign patent application EP 06023509.0 filed on Nov. 11, 2006, the disclosures of which are incorporated herein by reference in its entirety.

FIELD OF THE INVENTION

The present invention relates to a butter making device.

BACKGROUND OF THE INVENTION

Butter making devices are known, for instance from the applicant.

Butter is normally made in a butter making machine. Butter-making machines are known which are divided into three sections:
churning section
separating section
working section, which preferably comprises two stages, i.e. working section I and working section II.

Normally the machine frame is covered with easily-detachable, smooth finished, stainless steel panels that protect the internal parts of the butter-making machine.

The various sections of the butter-making machine are provided with frequency converter controlled driving systems.

The butter making machine is filled with milk or cream. In the separating section butter milk is separated as a by-product. The remaining mass is processed further in a working section which is normally separated into two successive working sections. Normally additives like water and or flavours are added to the butter mass in the working section in order to avoid a contamination of the butter milk with the additives. At the end of the working section the basic butter or special butter (depending on the additives) is discharged and normally passed to a butter silo for storing. Following the butter silo there are normally butter packing lines, for instance one to seven depending on the output rate of the butter making machine. This technique is well known and used to make different butter types on separate butter making machines.

The new generation of continuous butter making machines meets the most rigorous requirements of modern butter production. New principles in PLC control ensure easy, accurate dosing of water, salt and cultures. However for each different product type a separate butter making machine is needed.

For butter making machines having two successive working sections, excellent moisture distribution and average water droplet sizes <0.5 nm are possible due to the double working section. This improves bacteriological quality and increases shelf-life.

Preferably a very efficient vacuum treatment is provided which makes it possible to reduce the air content in the butter below 0.5% volume resulting in:
Improved texture and body
Less risk for oxidation
Better keeping qualities
No lamination problems This ensures consistent high butter quality. Efficient vacuum treatment results also in easier packing and less down-time on packing machines.

The butter making machine is flexible:
The butter-making machine has great flexibility in capacity range and the machine can churn cream with fat content between 25% and 49%.
Sweet cream, cultured cream and whey cream can be churned on the same machine
Tempered cold store butter can be pumped to the vacuum chamber—for mixing with freshly churned butter in any proportion
The butter pump makes it possible to pump the butter over long distances, ensuring flexibility in layout, which is especially important in upgrading existing production facilities.

Preferably the embodiments of the inventions have these features other features of known butter making machines if they comprise a butter making machine.

According to the prior art separate butter making machines are needed to make butter with different types, for instance with different additives to be added into the working section. Accordingly there is space and energy needed for each of the separate butter making machines. This is very cost extensive.

SUMMARY OF THE INVENTION

The object of the invention is to provide a butter making device being able to provide at least two different butter types.

The object of the invention is achieved by a butter making device accordance with the features of at least one of the independent claims. Preferred embodiments of the invention are disclosed in the dependent claims.

In accordance with an embodiment of the invention there is provided a butter making device comprising a butter containing section containing a basic butter product to be processed further, a dosing unit for adding additives to the basic butter product, a flow restricting and generating device disposed at the butter containing section for passing butter from the butter containing section for further processing the basic butter product to the dosing unit, at least one further dosing unit, and at least one further flow restricting and generating device disposed at the butter containing portion for passing basic butter containing section to the at least one further dosing unit.

In accordance with the invention at least one of the flow generating and restricting devices can comprise a pump, preferably a butter pump.

In accordance with the invention at least one of the flow restricting and generating devices can comprise a valve, preferably a regulating valve.

In accordance with the invention at least two flow restricting and generating devices each can comprise a separate pump, preferably a butter pump.

In accordance with the invention the butter containing section can be a working section of a butter making machine, preferably the final working section of a butter making machine. Alternatively it can be any butter storage means suitable for the attachment of for instance two or more pumps or equivalent means.

In accordance with an embodiment of the invention there is provided a butter making machine having a separating section and a working section wherein a flow restricting and generating device is at the outlet of the working section to restrict and generate an outflow of a basic butter product from the working section of the butter making machine, wherein there is at least one further flow restricting and generating device for restricting and generating a separate flow of a basic butter product from the working section of the butter making machine.

In accordance with the invention at least one of the flow restricting and generating devices can comprise a pump, preferably a butter pump.

In accordance with the invention at least two flow restricting and generating devices can comprise a separate pump, preferably a butter pump.

In accordance with the invention at least one of the flow restricting and generating devices can comprise a valve, preferably a regulating valve.

In accordance with the invention the separating section can have an inlet for feeding a mass processed in a churning section and an outlet for discharging butter milk.

In accordance with the invention the working section can be separated into two separate working sections.

In accordance with another aspect of the invention there is provided preferably with one or more of the above mentioned features a butter making machine having a separating section, a first working section and a second working section, wherein at the end of the first working section a pump, preferably a butter pump is provided. This has the advantage that the running parameters can be adjusted more conveniently.

In accordance with an embodiment of the invention there is provided a method for making butter with the following steps:
  (a) providing a basic butter product in one butter containing section,
  (b) passing the basic butter product to a dosing unit
  (c) adding additives to the basic butter product
  (d) optionally homogenizing the butter product,
wherein preferably in step (b) the basic butter product is separated and passed to at least two separated dosing units, and that in each dosing unit additives are added to the basis butter product as desired in order to obtain separately two different butter products.

In accordance with the invention at least two flow restricting and generating devices can be are used for separating the basic butter product, wherein each flow restricting and generating device can be used to pass a separated portions of the basic butter product to the respective dosing unit.

In accordance with the invention at least one of the flow restricting and generating devices can comprise a pump, preferably a butter pump.

In accordance with the invention at least two flow restricting and generating devices can comprise a separate pump, preferably a butter pump.

In accordance with the invention at least one of the flow restricting and generating devices can comprise a valve, preferably a regulating valve.

In accordance with the invention the butter containing section can be the working section of a butter making machine, preferably the final working section of a butter making machine.

In accordance with the invention the butter containing section can be a butter silo or any other butter storage device.

In accordance with an embodiment of the invention there is provided a butter making machine with a working section and two pumps disposed at the outlet of the working section.

In accordance with the invention the working section can comprise a first working section and a second working section, wherein preferably a regulating valve and further preferably a vacuum chamber can be provided between the two working section.

In accordance with the invention the butter making machine can further comprising a separating section and optionally a churning section.

In accordance with the invention the butter making machine can further comprising a pump, preferably a butter pump at the end of the first working section.

BRIEF DESCRIPTION OF THE DRAWINGS

Preferred embodiments of the invention are shown in the attached drawings.

DETAILED DESCRIPTION

Figure 1:
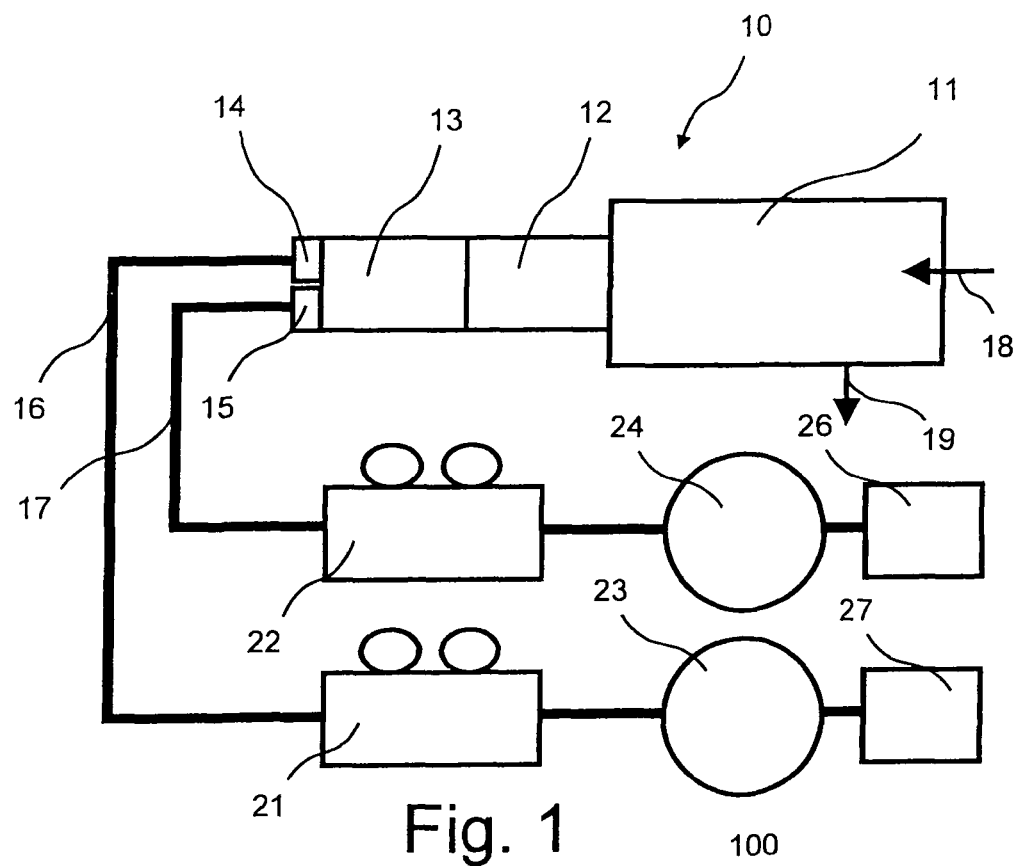
FIG. 1 is a schematic sketch of a butter making device in accordance with the preferred embodiment of the invention.
Figure 4:
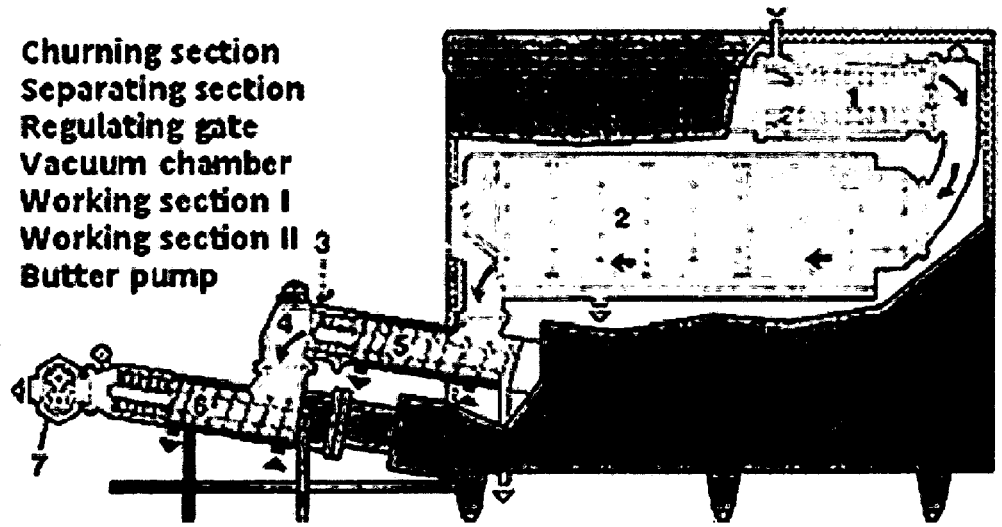
FIG. 4 is a schematic sketch of a butter making machine.

FIG. 1 shows a butter making machine 10 comprising a separating section 11 into which by means of line 18 row product mass is introduced and butter milk is discharged as a by-product via line 19. Preferably the row product mass (normally cream or milk optionally with additives if desired) has previously be processed in a churning section (not shown in FIG. 1). Preferably the butter making machine has the features of the butter making machine as shown in FIG. 4. Reference is made to the description thereof. The butter mass generated in the separating section 11 is passed to a first working section 12 for further processing. In the first working section 12 there is an inlet 20 for those additives as desired and/or required. For instance the water content will be increased up to the legally allowable rate (for instance 16%, but depending on the law of the country the final product is to be sold). Following the first working section 12 there is a second working section 13 wherein the butter mass coming from the first working section 12 is further processed. At the end of the second working section 13 there are at least two pumps 14, 15 controlling the output rate of basic butter into line 16 and line 17, respectively. The pumps 14 and 15 are restricting the entrance of produce butter from the working section 13 into the line 16 and line 17, respectively and generating a respective pressure into the line 16 and line 17 such that the butter can be passed to further processing. Depending on the speed of the respective pump the flow rate of butter into the line connected with the pump can be controlled as required. For instance the flow rate of butter into line 16 can be in the range of 0.5 to 5 t per hour and the flow rate of basic butter into line 17 can be in the range of 0.5 to 5 t per hour.

Normally the flow rate of incoming butter mass into working section 2 will be little higher than the overall flow rate in the output lines 16 and 17 (i.e. the sum of the flow rate in line 16 and the flow rate in line 17) in order to ensure that enough butter is provided at the input of the pumps 14 and 15.

The pumps 14 and 15 are generating a pressure into the lines 16 and 17 such that the butter emerging from the butter making machine can be passed to distance butter silos. In each line 16 and 17 there are provided separate dosing units 21 and 22, respectively. Preferably a butter homogenizer is included in the dosing unit in order to get the required final product quality. In each dosing unit 21, 22 different additives can be added to the basic butter in order to obtain different butter products. Butter products emerging the respective dosing unit are passed further on into respective butter silos 23 and 24. From the butter silos 23 and 24 the butter as passed further into butter packing lines. For instance there are provided one to seven butter packing lines.

The advantages of the invention according to this embodiment will be clearer from the following example. If one wants to make two different butter products with a production rate of 5 t per hour for each product, there was a need for two different butter making machines having a respective output capacity of 5 t per hour. According to the invention it will be possible to use only one butter making machine having a capacity of 10 t per hour wherein the outcoming butter will be separated at the outlet of the second working section into two separate lines with respective flow rates of 5 t per hour. Running one butter making machine having an output capacity of 10 t per hour is much cheaper than running two butter making machines each having an output rate of 5 t per hour. Besides the huge savings in the cost for buying the machine there are also huge savings in the needed space and maintenance of the equipment.

The same advantages are for smaller or bigger instalments. For instance one machine having a capacity of 1 t per hour can be used instead of two machines having a capacity of 0.5 t per hour.

In the content of this application the term "basic butter product" in intended to mean a butter product having the normal components of butter. Optionally any additives which are intended to be added to the at least two different final butter products can be added into the basic product before it is separated.

It is clear that more than two flow restricting and generating devices can be used in order to produce mare than two different products with one butter making device. For instance three or four or even more flow restricting and generating devices can be used. Preferably the flow restricting and generating devices are each embodied as a separate pump having the desired capacity. The pumps are preferably butter pumps. More preferably the butter pumps have the features of the butter pumps which are sold by the applicant.

Figure 2:
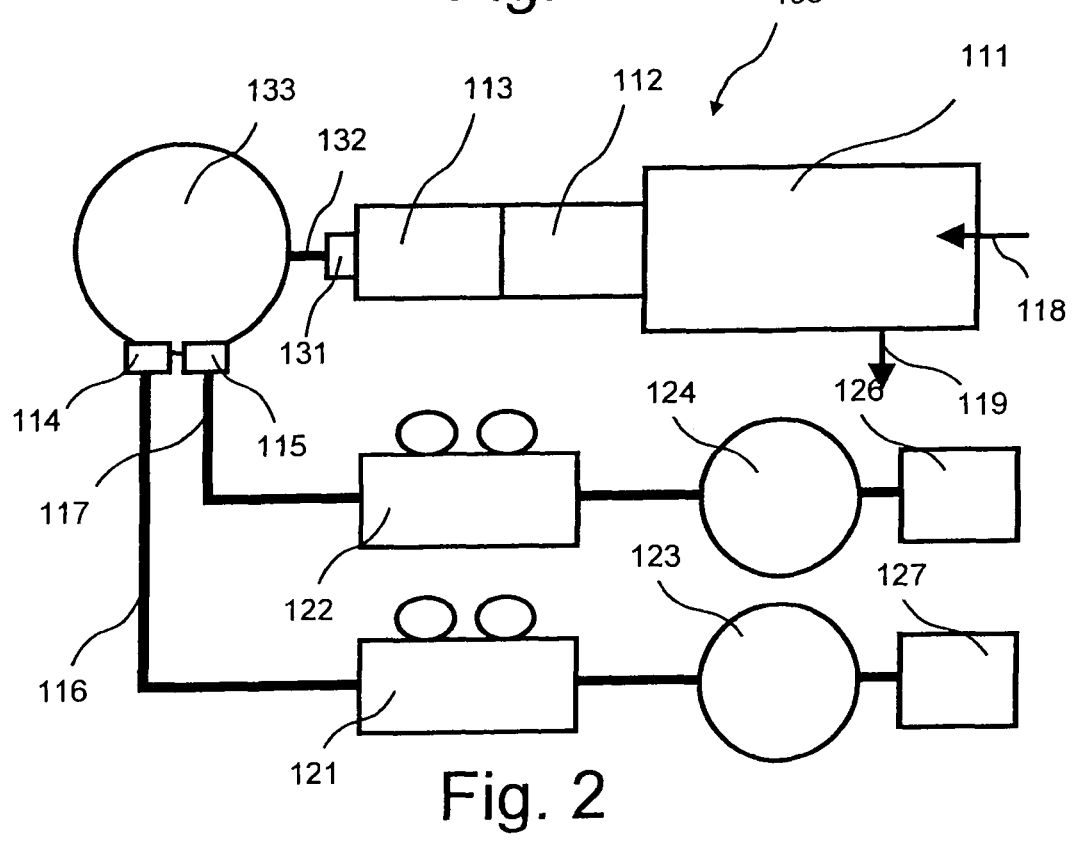
FIG. 2 is a schematic sketch of a butter making device in accordance with another embodiment of the invention.

FIG. 2 shows another embodiment in accordance with the invention. There is a conventional butter making machine 110 corresponding to the butter making machine of the embodiment of FIG. 1. Reference is made to the description thereof. At the end of the butter making machine there is one pump 131 feeding the basic butter into line 132 and further into a butter silo 133. It is also possible to feed the basic butter after the butter making machine directly into the butter silo 133 in a conventional matter without having a pump at the outlet of the butter making machine.

At the outlet of the butter silo there are two pumps 114 and 115 provided feeding butter into a dosing unit 121 and 122, respectively. Again a respective butter homogenizer may be included into each dosing unit 121 and 122. All butter emerging the respective dosing units 121 and 122, respectively, is feed into butter packing lines 125 and 126, respectively, in a conventional manner. Two different final butter products are obtained because at the dosing units 123 and 124 different additives can be added to the basic butter as desired and/or required.

According to the invention it is possible to have one storage device containing basic butter and passing the butter into at least two separate dosing units for further storage or packing and distributing. The storage device can either be the outlet of the normal butter making machine which will be the preferred embodiment of the invention or any storage device like a butter silo.

Figure 3:
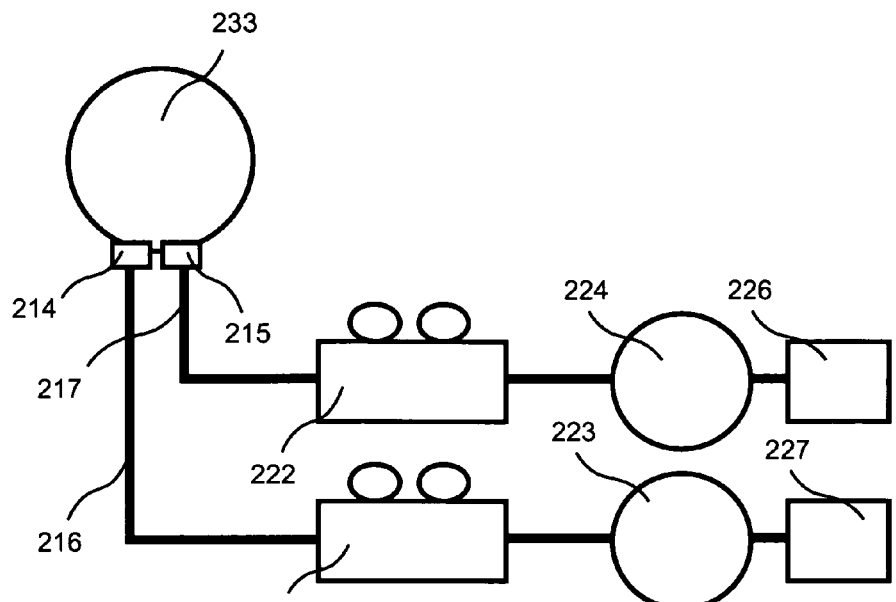
FIG. 3 is a schematic sketch of a butter making device in accordance with another embodiment of the invention.

FIG. 3 is a sketch of a further embodiment of the invention. A basic butter product is feed in a butter silo 233 in a conventional manner known to the skilled person in the art. At the outlet of the butter silo 233 there are two pumps 214 and 215, preferably butter pumps as mentioned above. The pumps 214 and 215 are feeding the basic butter product into lines 216 and 217, respectively. The basic butter product is passed on to separate dosing units 221 and 222 as described above in connection with the other embodiments. In the dosing units there are preferably butter homogenisers as stated above. In the dosing units 221, 222 additives are added as desired and required. The processed and optionally homogenized product is then optionally stored in butter silos 223, 224 and passed onto packing lines 225, 226, respectively, as known to the skilled person in the art. It will also be possible to pass the final butter product directly from the dosing units 221 and 223 to the packing lines 225 and 226, respectively, without having storage means therebetween.

FIG. 4 shows a schematic sectional side view of a butter making machine which is preferably used in the embodiments of the invention comprising a butter making machine.

The butter making machine as shown in FIG. 4 comprises a churning section 1 into which row material as cream or milk is feed. The processed product is passed along the arrows at the left hand side through a pipe to a separating section 2 where butter milk is separated from the row product. The product mass is passed into a working section comprising a first working section 5 and a second working section 6. In the first working section 5 the product is screwed to a flow regulating valve 3 into a vacuum chamber 4. From the vacuum chamber 4 the product is passed further to the second working section 6. At the end of the second working section 6 there is butter pump 7 for passing the basic butter product onto further processing.

If the butter making machine of FIG. 4 is used for the embodiment of FIG. 1 it is preferred to have at least two separate butter pumps at the outlet of the second working section 6. If used for the embodiment of FIG. 2, one butter pump or even no butter pump is required because the basic butter product can directly be feed into a butter silo without having a butter pump.

It is clear that any butter making machine can be used. For instance the regulating valve and the vacuum chamber can be omitted or replaced by other suitable means.

According to another aspect of the invention it will be advantageous to replace the flow regulation valve after the first working section I by a pump, preferably a butter pump. The advantage will be that the output rate of the first working section I will than be independent from the pressure applied thereon by the material feed into the first working section because it will be determined by the rate with which the pump is pumping material into the vacuum chamber (or the second working section if the vacuum chamber is omitted). Accordingly the input pressure can be regulated independent from the output rate. Varying the input pressure will have an effect to the parameters of the resulting product. Therefore providing a pump at the end of the first working section will provide the advantage that the butter making machine can be adjusted to the requirements much more conveniently and with more options. Accordingly the present invention relates also to an improved butter making machine having a pump at the end of the first and second working section.

It is clear that the description of the specific embodiments of the invention is not be intended to limit the scope of protection which is defined by the claims. It is also clear that obvious alternatives which the skilled person will notice by reading the specification, are intended to be in the scope of protection as defined by the claims.

The invention claimed is:
1. A butter making device comprising:
   a butter containing section containing a basic butter product to be processed further,
   a dosing unit for adding additives to the basic butter product, and
   a flow restricting and generating device disposed at the butter containing section for passing butter from the butter containing section for further processing the basic butter product to the dosing unit, wherein at least one further dosing unit and at least one further flow restricting and generating device disposed at the butter containing portion for passing basic butter containing section to the at least one further dosing unit.

2. The butter making device of claim 1, wherein at least one of the flow generating and restricting devices comprises a butter pump.

3. The butter making device of claim 1, wherein at least one of the flow restricting and generating devices comprises a regulating valve.

4. The butter making device of claim 1, wherein at least two flow restricting and generating devices each comprise a separate butter.

5. The butter making device of claim 1, wherein the butter containing section is the final working section of a butter making machine.

6. A butter making machine having a separating section and a working section wherein a flow restricting and generating device is at the outlet of the working section to restrict and generate an outflow of a basic butter product from the working section of the butter making machine, wherein there is at least one further flow restricting and generating device for restricting and generating a separate flow of a basic butter product from the working section of the butter making machine.

7. The butter making machine of claim 6, wherein at least one of the flow restricting and generating devices comprises a butter pump.

8. The butter making machine according to claim 6, wherein at least two flow restricting and generating devices comprise a separate butter pump.

9. The butter making machine according to claim 6, wherein at least one of the flow restricting and generating devices comprises a regulating valve.

10. The butter making machine of claim 6, wherein the separating section has an inlet for feeding a mass processed in a churning section and an outlet for discharging butter milk.

11. The butter making machine of claim 6, wherein the working section is separated into two separate working sections.

12. A butter making machine according to claim 6, having a separating section, a first working section and a second working section, wherein in that at the end of the first working section a butter pump is provided.

13. A butter making machine with a working section and two pumps disposed at the outlet of the working section.

14. The butter making machine of claim 13, wherein the working section comprises a first working section and a second working section, wherein preferably a regulating valve and further preferably a vacuum chamber is provided between the two working section.

15. The butter making machine of claim 14, further comprising a separating section and a churning section.

16. The butter making machine of claim 15, further comprising a butter pump at the end of the first working section.

* * * * *